United States Patent [19]
Chapman

[11] 4,250,605
[45] Feb. 17, 1981

[54] BIAXIALLY STRESSED FLUORINATED POLYMER ROLL COVER AND METHOD FOR MAKING SAME

[75] Inventor: Harry S. Chapman, Hickory, Pa.

[73] Assignee: The Carborundum Company, Niagara Falls, N.Y.

[21] Appl. No.: 870,771

[22] Filed: Jan. 19, 1978

[51] Int. Cl.³ .............. B21B 31/08; B60B 5/00; B32B 31/00; B29C 27/00
[52] U.S. Cl. .............. 29/132; 156/86; 156/629; 156/645; 156/668; 428/36
[58] Field of Search .......... 29/132, 133; 156/86, 156/629, 645, 668; 428/36; 174/DIG. 8

[56] References Cited

U.S. PATENT DOCUMENTS

| | | | |
|---|---|---|---|
| T934,010 | 5/1975 | Maskornick | 29/132 |
| 3,067,078 | 12/1962 | Gluck | 156/629 |
| 3,260,776 | 7/1966 | Lindstrom et al. | 428/36 |
| 3,426,119 | 2/1969 | Chapman et al. | 156/86 |
| 3,435,500 | 4/1969 | Aser et al. | 29/132 |
| 3,481,805 | 12/1969 | Holmes et al. | 29/132 |
| 3,602,759 | 8/1971 | Evans | 174/DIG. 8 |
| 3,749,621 | 7/1973 | Shoffner | 156/86 |
| 3,788,503 | 1/1974 | Hirose et al. | 264/95 |

FOREIGN PATENT DOCUMENTS

| | | |
|---|---|---|
| 844895 | 8/1960 | United Kingdom . |
| 1124036 | 8/1968 | United Kingdom . |
| 1136866 | 12/1968 | United Kingdom . |
| 1141895 | 2/1969 | United Kingdom . |
| 1148243 | 4/1969 | United Kingdom . |
| 1182045 | 2/1970 | United Kingdom . |
| 1182631 | 2/1970 | United Kingdom . |
| 1262659 | 2/1972 | United Kingdom . |
| 1278441 | 6/1972 | United Kingdom . |

*Primary Examiner*—William R. Dixon, Jr.
*Attorney, Agent, or Firm*—David E. Dougherty; Raymond W. Green; Michael L. Dunn

[57] ABSTRACT

A biaxially heat shrinkable sleeve, a prism which is usually a roller having its lateral area covered with a biaxially heat shrunken sleeve and the method for covering the lateral area of a prism such as a process roller with a biaxially heat shrunken sleeve.

28 Claims, 2 Drawing Figures

BIAXIALLY STRESSED FLUORINATED POLYMER ROLL COVER AND METHOD FOR MAKING SAME

BACKGROUND OF THE INVENTION (A) Field of the Invention

This invention relates to the installation of a heat shrinkable polymer roll cover over the lateral area of a process roll. The invention further relates to the heat shrinkable sleeve and the process roller covered with the sleeve.

(B) History of the Prior Art

Process rollers or rolls are used in industry to press, roll or convey sheet or laminar materials. Examples of such rolls are nip rolls for the production of plastic sheets and films, paper machine dryer drums used in the production of paper and textile dyeing and drying drums used in the production of textiles.

Originally, such process rolls had a metallic surface. These surfaces were sometimes covered with a polymer film to obtain better corrosion resistance or better abrasion resistance. In addition, such metallic surfaces are now known to have high surface energy characteristics which frequently causes the material being processed to stick to the roll. In most processes, such sticking or adhesion cannot be tolerated.

In order to reduce the surface energy of such process rolls, the rolls were frequently covered with a fluorinated polymer as soon as such polymers became available for such applications.

One of the better methods for covering such rolls in the prior art consisted of placing the roll within a radially elongated fluorinated polymer sleeve which was then heat shrunk to provide a tight fitting roll cover.

Such covers, however, continued to have serious problems since, especially in large rollers, the cover expanded in the axial direction when the roll was heated thus causing uneven roller surface characteristics. Furthermore, especially in larger rollers, the sleeve was able to move on the roller, particularly at high temperatures, which also caused uneven roller surface characteristics.

In order to avoid axial elongation when it was required to heat a roller, the sleeves were axially stretched at the time of application of the sleeve to the roller. Such axial stretching at the time of applying the sleeve to the roller made the application of the sleeve exceedingly difficult and required complicated processes and apparatus. Examples of such processes and apparatus to axially stretch a sleeve during application to a roller are disclosed in U.S. Pat. Nos. 3,426,119 and 3,749,621. Furthermore, such sleeves continued to be free to move on the roller thus creating uneven surface characteristics.

In order to prevent such movement, various adhesives were tried which, while being somewhat successful at low temperatures, were not completely successful at high processing temperatures such as those encountered in paper drying. Certain adhesives were, for example, tried and were found to become brittle at high temperatures, i.e., above about 150° C., and were found to have insufficient adhesion to the fluorinated polymer sleeve.

U.S. Pat. No. 3,481,805 discloses that a silicone resin adhesive could be used when the inside surface of a sleeve was preliminarily etched to aid the adhesive. The patent does not, however, disclose the axial stretching of the sleeve during its application to a roller. Furthermore, the silicone resin adhesive was still insufficiently adherent to a fluorinated polymer sleeve to prevent the sleeve from moving under high temperature conditions.

As a result of the foregoing disadvantages, no commercially available prior art fluoropolymer covered roller was able to operate for an extended period at temperatures in excess of 120° C.

BRIEF DESCRIPTION OF THE INVENTION

In accordance with this invention, there is therefore provided a polymer sleeve for a prism which is usually a cylinder such as a process roller, which can be readily applied to the cylinder, a process for applying this sleeve to the prism, e.g., a cylinder which prevents movement of the sleeve upon the cylinder even at temperatures as high as 260° C. (500° F.) and a combined prism and sleeve manufactured in accordance with the process.

The cylinder is usually a process roller, having its lateral area covered with the biaxially heat shrunken polymer sleeve wherein the sleeve is preferably adhesively bound to the lateral surface of the cylinder with a high temperature elastomeric adhesive which is desirably a polydimethylsiloxane. The novel sleeve is biaxially stretched beyond its room temperature elastic limit. The interior surface of the sleeve is desirably slightly abraded, e.g. with 00 steel wool or with a very fine abrasive, e.g. 600 grit or smaller, and etched with a composition selected from the group consisting of sodium dissolved in liquid ammonia; sodium dissolved in a mixture of naphthalene and tetrahydrofuran; and molten sodium hydroxide. The method for covering the lateral area of a cylinder with a heat shrinkable polymer sleeve comprises placing the biaxially heat shrinkable sleeve over the lateral area of a cylinder and biaxially heat shrinking the sleeve into a tight fitting relationship with the cylinder by applying heat to the sleeve. The sleeve is selected so that at least 1%, preferably 2% and most preferably at least 3% residual biaxial stress remains in the sleeve after heat shrinking. Desirably, a silicone adhesive is applied between the lateral surface of the cylinder and the interior surface of the sleeve and the interior surface is desirably slightly abraded and etched as previously described.

DETAILED DESCRIPTION OF THE INVENTION

Figure 1:
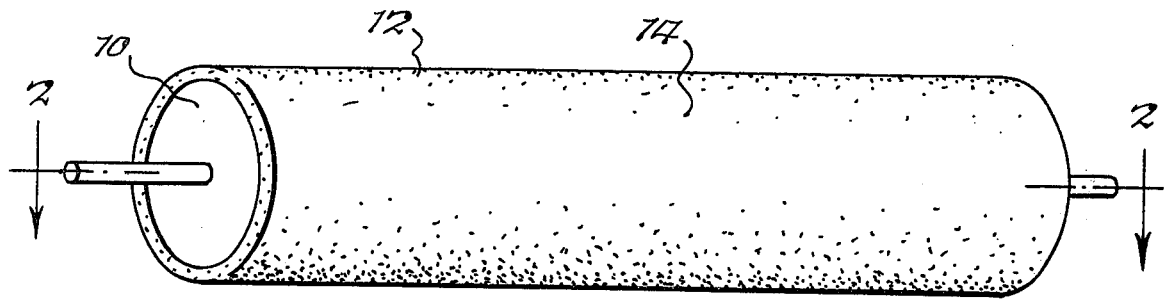
FIG. 1 is an end perspective view of a roller covered with a fluorocarbon polymer roll cover in accordance with the invention.

In accordance with the invention, there is provided a prism such as a cylinder having its lateral area covered with a biaxially heat shrunken polymer, preferably a fluoropolymer, sleeve.

"Prism" as used herein means any prism having from three to an infinite number of sides, i.e., a cylinder. The circumference of the prism need not be completely uniform along its entire length but for a tight sleeve fit should generally not have a circumference which varies by over 100% and the prism should not have axial concave portions which are greater than 50% of the radius of the prism. The prism should have no radial concave portions for a tight sleeve fit. Whenever "cylinder" is used herein, it is to be understood that other prisms can be substituted for a cylinder.

"Lateral Area" as used herein means the surface area of a prism such as a cylinder excluding the end surface areas.

"Sleeve" as used herein means a tube formed from a flexible polymeric material which has a wall thickness which is thin relative to the overall tube diameter, e.g. usually not thicker than about 0.01 times the overall diameter. Relatively thicker walls can be used when very small diameter cylinders are being covered. Examples of such cylinders are small tubes such as ⅛ inch diameter heat exchange conduit. The prism is almost always a cylinder which is usually a process roller such as those encountered in plastic film, paper, and textile industries. The cylinder or roller can be made of any suitable material such as natural rubber, silicone rubber, steel or combinations thereof such as rubber covered steel.

"Axial" as used herein means along the longitudinal axis of the sleeve or cylinder.

"Biaxially" as used herein means along both the axial and radial axes of the cylinder or sleeve or in directions perpendicular to each other along the surface of the flexible plastic material from which the sleeve is manufactured.

The polymer from which the sleeve is manufactured may be any flexible polymer which can be used at temperatures of about 100° C. or above and which can be biaxially stretched beyond its room temperature elastic limit yet biaxially shrink upon the application of heat. The polymer is usually an alkene polymer such as polyethylene, polypropylene and substituted polyethylenes and polypropylenes such as polyvinyl chloride, chlorovinylidene and polytetrafluoroethylene. The thickness of the sleeve is usually from about 0.001 to about 0.5 cm., and most frequently from about 0.025 to about 0.25 cm. for most applications. The polymer should have low surface energy to prevent material being processed, such as polyethylene film, textile or paper, from sticking to the roller. Examples of suitable fluorinated polymers are polytetrafluoroethylene (PTFE), fluorinated ethylene-propylene copolymer (FEP) and perfluoroalkoxy fluoroalkane polymers (PFA).

PFA and PTFE are particularly good under temperature conditions as high as 260° C. whereas FEP is a melt processable material which is suitable for use at temperatures as high as 200° C.

The interior surface of the sleeve is desirably adhesively bound to the lateral surface of the cylinder to prevent movement of the sleeve about the cylinder while the cylinder is in use. The adhesive should be a high temperature elastomeric adhesive; i.e., an adhesive stable at use temperatures without becoming brittle and without losing its adhesive properties. Examples of such adhesives are usually specific adhesives selected for their properties which comprise a polymer selected from polysufones, silicones, polyurethanes, and silicone and fluorine modified epoxies. The most preferred adhesive is a silicone elastomer adhesive which is preferably a polydimethylsiloxane since such an adhesive is able to bind the fluorinated polymer sleeve to the cylinder yet function at a temperature as high as 260° C. without becoming brittle or decomposing. An example of a suitable polydimethylsiloxane silicone elastomer adhesive is a polydimethylsiloxane with pendant hydroxy groups available from Dow Corning Corporation under the designation RTV 140. Similar adhesives are also available from General Electric Company.

Another very desirable adhesive is a silicone elastomer adhesive comprising a chain which contains polydimethylsiloxane, alkane and phenylmethylsilane groups. Such an adhesive is available from Dow Corning under the designation 96-083 and is cured by means of a catalyst comprising platinum. This adhesive is particularly desirable, not only due to its performance at high temperatures but due to its ability to cure without emitting undesirable gases or vapors. The RTV 140 type adhesive has been found to emit gases or vapors which can cause bubbling under the sleeve. It has, however, been unexpectedly found that very small holes or perforations can be placed in a process roller sleeve to permit venting of such gases without causing surface imperfections in material which is subsequently processed by the roller. The size of the holes can be up to about 4 mm for certain applications but desirably should have a diameter of from about 0.1 to about 0.5 millimeters. The distance or interval between holes should be from about 0.1 to about 5 cms.

In order to further enhance the adhesion of the sleeve to the lateral surface of the cylinder, the internal surface of the sleeve is desirably etched. The etching composition is usually selected from a composition comprising sodium dissolved in liquid ammonia; a composition comprising sodium dissolved in tetrahydrofuran and naphthalene; and a composition comprising molten alkali metal hydroxide such as sodium hydroxide.

Adhesion is even further enhanced if prior to etching the interior surface of the sleeve is slightly abraded with very fine steel wool or about 600 grit or finer and preferably 1,000 grit or finer polishing abrasive such as silicon carbide or alumina. The abrasive is preferably a loose abrasive powder or steel wool but may be a coated or bonded abrasive product.

The method in accordance with the invention comprises placing the biaxially heat shrinkable sleeve over a cylinder and biaxially shrinking the sleeve into a tight fitting relationship with the cylinder by applying heat to the sleeve. As previously discussed, the cylinder is usually a process roller. Any suitable means for placing the sleeve over the cylinder may be used. The sleeve may be preformed and slipped over the cylinder or a biaxially stretched heat shrinkable polymer sheet may be wrapped over the lateral surface of the cylinder and seamed to form a sleeve. Heat is then applied to shrink the sleeve. After shrinking, usually at least 1% and preferably at least 3% but usually less than 25% residual biaxial stress remains in the sleeve at operating temperature and pressure, that is, the sleeve would further contract the additional percentage in both the axial and radial directions at operating temperature if it were not restrained by the cylinder.

The biaxially heat shrinkable fluorinated polymer sleeve, again as previously discussed, is manufactured from a polymer, preferably a fluorinated polymer, which can be biaxially stretched beyond its room temperature elastic limits yet biaxially shrink upon the application of heat. The sleeve has a finished thickness of from about 0.05 to about 0.15 centimeters for most applications. The sleeve is prepared by biaxially expanding a smaller sleeve or the film from which it is made, in both the radial and axial directions beyond its room temperature elastic limits. That is, at room temperature it retains a dimension larger than its unexpanded dimension for a sufficient time to slip the sleeve over the roll.

For ease of processing, such expansion may take place at an elevated temperature, eg., about 100° C., followed by cooling of the sleeve to room temperature. Once it was determined, in accordance with this invention, that biaxial expansion of the sleeve was desirable, numerous methods of obtaining such biaxial expansion become apparent to those skilled in the art.

In one embodiment for obtaining such biaxial stretching or expansion, end plugs are installed in two ends of a piece of fluoropolymer tubing such as FEP tubing and tightly banding the tubing to the plug to prevent loss of air and slippage. The plugs are connected in the center by means of a pipe that can be extended such as a hydraulic ram. The assembly is then placed in a sizing pipe of a larger diameter. The assembly is then heated as with application of steam inside the sizing pipe and on the outside of the inserted assembly to a temperature of about 105° C. The tubing is then extended axially by lengthing the pipe between the end plugs and circumferentially or radially by air pressure inside the tubing applied through one of the plugs. The tube is thereby distended to the length of the pipe between the end plugs and radially to the inside diameter of the sizing pipe. The sleeve is then cooled thus producing a roll cover which becomes smaller in circumference and shorter in length when subsequently heated to a temperature of above about 110° C.

Other methods and apparatus for biaxially stretching the sleeve beyond its room temperature elastic limits are possible. For example, a formed tube or sleeve can be draw over a tapered mandrel to stretch it radially, i.e., to lengthen the radius as well as the circumference, and the force applied against the friction to pull it over the mandrel would be used to stretch it axially. It is also possible to biaxially stretch a polymer film before it is made into a sleeve. For example, a film could be biaxially calendered or could be placed in or on an expandable frame or rack and pulled in biaxial directions. Similarly, a finished tube or sleeve can be placed in or on an expandable frame or rack or calendered in biaxial directions. The film or sleeve in or on a frame or rack can be gripped at its edges by clamps attached to the frame or rack or the film or sleeve be wrapped around the frame or rack, e.g., pipes which are then separated. A particularly desirable method for biaxially stretching a sleeve or tube is to radially expand it with a compressed gas within a retaining tube which can be readily adjusted to different diameters, eg., a screen or canvas which is rolled at its edges to change the diameter of a cylinder formed by the screen or canvas, while axially stretching the sleeve by any suitable means. When the tube or sleeve is radially expanded with compressed air or other gas, it is desirable to expand the ends of the sleeve or tube first, eg., by end calendering or placing an expandable sphere within each end and blowing up the spheres with compressed air. Another method for biaxially stretching or expanding a film or sleeve is to hammer the film or sleeve, eg., with a reciprocating hammer on one surface of the film or sleeve and an anvil on the opposing surface of the film or sleeve. The area struck by the hammer should be small relative to the total surface of the film or sleeve and the film or sleeve should move relative to the hammer and anvil so that essentially the entire film or sleeve is struck between the hammer and anvil.

Many other possibilities for biaxially distending or expanding the sleeve beyond its cold temperature biaxial elastic limits can be envisioned by those skilled in the art.

Further, in accordance with the invention, and as previously discussed with respect to the resulting cylinder, the adhesive can be applied between the cylinder such as a roller and the interior surface of the sleeve. The adhesive may be applied by any suitable method as by brushing the adhesive on the cylinder before applying the sleeve or by injecting adhesive beneath the sleeve with a long hyperdermic type needle after the sleeve is applied to and shrunken upon the cylinder.

The sleeve, as previously discussed, may be slightly abraded and etched to further enhance adhesion of the sleeve to the lateral surface or area of the cylinder such as a process roller. Another method for increasing adhesion is by applying colloidal silica to the internal surface of the sleeve, i.e., the surface facing the cylinder and heating the silica coated surface before using the adhesive.

The resulting process roller is provided with a polymer sleeve, desirably a fluorinated polymer sleeve, which has a smooth surface and which does not move about the lateral surface or area of the roller at temperatures above 150° C., as high as 200° C. and even as high as 260° C. when appropriate fluorinated polymer sleeves and silicone elastomer adhesives are used.

Figure 2:
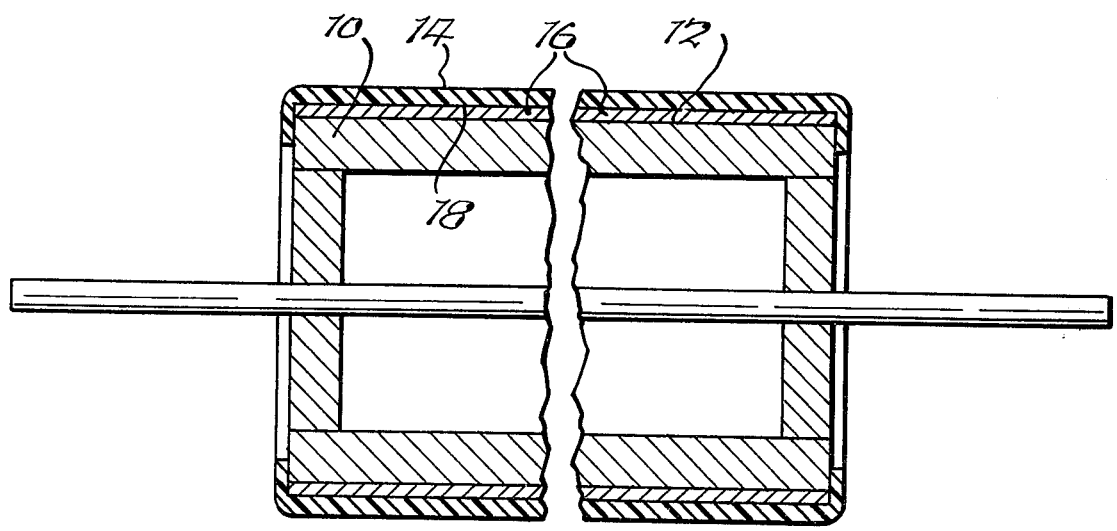
FIG. 2 is a cross sectional view of the roller shown in FIG. 1 taken along line 2—2 of FIG. 1.

Referring now to the drawings, FIG. 1 shows an end perspective view of a cylinder 10 having a lateral area 12 covered with a biaxially heat shrunken fluorinated polymer sleeve 14. As best seen in FIG. 2, sleeve 14 is secured to lateral area 12 by means of a silicone adhesive 16. Desirably, the interior surface 18 of sleeve 14 is slightly abraded and etched prior to securing sleeve 14 to lateral area 12 by means of adhesive 16.

The following examples are provided to more fully illustrate and not limit the invention. Unless otherwise indicated, all parts and percentages are by weight.

EXAMPLE I

An FEP polymer film having a thickness of about 0.5 millimeters is slightly abraded on one side with 00 steel wool and etched with a composition comprising 11.8 weight percent metallic sodium dissolved in a mixture of 11.8 weight percent napthalene and 78.4 weight percent tetrahydrofuran. The film is then formed into a sleeve in accordance with methods well known to those skilled in the art. The resulting seam is then abraded with 00 steel wool and etched with the composition comprising sodium dissolved in a mixture of naphthalene and tetrahydrofuran. The sleeve is formed so that it has an inside diameter of about 54 centimeters and a length of about 163 centimeters. The sleeve is then biaxially stretched by plugging the ends with aluminum plugs and banding the ends of the sleeves to the plugs. Compressed air is forced into the sleeve through one of the plugs at a pressure of about 2.45 kilograms per square centimeter. The plugs are simultaneously pulled in opposite directions with a force of about 1,000 kilograms over and above the force being applied against the plugs by the compressed air. The resulting sleeve has an inside diameter of about 61 centimeters and a length of about 178 centimeters. The sleeve is then slid over a steam heated textile drying drum having an outside diameter of about 58 centimeters and a lateral surface length of about 152 centimeters.

Each end of the sleeve is then heated to a temperature of about 95° C. and banded to the end of the cylinder. The entire sleeve is then heated to about 120° C. to shrink the sleeve into a tight fitting relationship with the cylinder. The cylinder and sleeve are then cooled to room temperature. About 158 grams of Dow Corning 96-083 adhesive is then injected beneath the sleeve along the length of the cylinder at several locations using a hyperdermic type syringe. The adhesive is then uniformly spread beneath the sleeve by moving a rubber squeegee about the external surface of the sleeve. The resulting sleeve and cylinder are then cured at 160° C.

The cylinder and sleeve are then placed into textile drying service at a temperature of 165° C. After a period of 18 months, the sleeve continues to have a smooth wrinkle-free appearance.

EXAMPLE II

The procedure of Example I is repeated except that the cylinder is a heating roll utilized for laminating plastic underlayment for carpet. The drum has an outside diameter of 40 centimeters and a length of about 221 centimeters. The inside diameter of the unstretched sleeve is about 37 centimeters and the length of the unstretched sleeve is 238 centimeters. The stretched sleeve has an inside diameter of about 42 centimeters and a length of 258 centimeters.

The finished roll and sleeve are utilized to laminate plastic to foam at a temperature of about 230° C. After a time period of 4 months, the sleeve has a smooth wrinkle-free appearance.

What is claimed is:

1. A process roller cylinder having its lateral area covered with a biaxially heat shrunken fluorinated polymer sleeve wherein said sleeve retains at least 3 percent residual biaxial stress.

2. The process roller of claim 1 wherein the interior surface of the sleeve is adhesively bound to the lateral surface of the cylinder with a high temperature elastomeric adhesive, said covered cylinder retaining a smooth surface at temperatures in excess of about 150° C.

3. The covered cylinder of claim 2 wherein said adhesive is a silicone elastomer adhesive.

4. The covered cylinder of claim 3 wherein said silicone elastomer adhesive is a polydimethylsiloxane with pendant hydroxy groups.

5. The covered cylinder of claim 3 wherein said silicone elastomer adhesive comprises a chain containing polydimethylsilioxane, alkane and phenyl methyl silane groups.

6. The covered cylinder of claim 5 wherein said sleeve has an interior surface with contacts said silicone elastomer adhesive, said interior surface having been etched with a composition selected from the group consisting of sodium in liquid ammonia, sodium in tetrahydrofuran and molten sodium hydroxide.

7. The covered cylinder of claim 5 wherein prior to etching said interior surface is slightly abraded.

8. A method for covering the lateral area of a process roller with a fluorinated polymer sleeve which comprises:
(a) placing a biaxially heat shrinkable fluorinated polymer sleeve over the lateral area of the roller; and
(b) biaxially shrinking said sleeve into a tight fitting relationship with the lateral area of the roller by applying heat to the sleeve, said sleeve retaining at least three percent residual biaxial stress after shrinking into said tight fitting relationship.

9. The method of claim 8 wherein a high temperature elastomeric adhesive is applied between the roller and the interior surface of the sleeve.

10. The method of claim 9 wherein prior to applying said adhesive, the interior surface of the sleeve is etched with a composition selected from the group consisting of sodium dissolved in liquid ammonia; sodium dissolved in a mixture of napthalene and tetrahydrofuran; and molten sodium hydroxide.

11. The method of claim 10 wherein prior to etching said interior surface is slightly abraded.

12. The method of claim 11 wherein said high temperature elastomeric adhesive is a silicone adhesive comprising a polydimethylsiloxane.

13. The method of claim 12 wherein said silicone adhesive is a polydimethylsiloxane with pendant hydroxy groups.

14. The method of claim 12 wherein said silicone elastomer adhesive comprises a chain containing polydimethyl siloxane, alkane and phenylmethylsilane groups.

15. The method of claim 12 wherein said silicone adhesive does not evolve gas or vapor during curing.

16. The method of claim 11 wherein said silicone adhesive comprises a polydimethylsiloxane.

17. The method of claim 16 wherein said fluorinated polymer is a fluorinated hydrocarbon polymer selected from the group consisting of polytetrafluoroethylene, polyfluoropropylene and copolymers of tetrafluoroethylene with fluoropropylene.

18. The method of claim 11 wherein said fluorinated polymer comprises a fluorinated hydrocarbon polymer chain and is selected from the group consisting of polytetrafluoroethylene, polyfluoropropylene, copolymers of tetrafluoroethylene with fluoropropylene and polyperfluoroalkoxy fluoroalkane.

19. The method of claim 10 wherein said silicone adhesive comprises a polydimethylsiloxane.

20. The method of claim 19 wherein said fluorinated polymer is a fluorinated hydrocarbon polymer selected from the group consisting of polytetrafluoroethylene, polyfluoropropylene and copolymers of tetrafluoroethylene with fluoropropylene.

21. The method of claim 10 wherein said fluorinated polymer comprises a fluorinated hydrocarbon polymer chain and is selected from the group consisting of polytetrafluoroethylene, polyfluoropropylene, copolymers of tetrafluoroethylene with fluoropropylene and polyperfluoroalkoxy fluoroalkane.

22. The method of claim 9 wherein said sleeve is provided with holes between about 0.1 and about 4 mm in diameter spaced at an interval of from about 0.1 about 5 cm to permit passage of gas or vapor.

23. The method of claim 9 wherein said fluorinated polymer is a fluorinated hydrocarbon polymer.

24. The method of claim 23 wherein said fluorinated polymer is a fluorinated hydrocarbon polymer selected from the group consisting of polytetrafluoroethylene, polyfluoropropylene and copolymers of tetrafluoroehtylene with fluoropropylene.

25. The method of claim 8 wherein said fluorinated polymer is a fluorinated hydrocarbon polymer.

26. The method of claim 25 wherein said fluorinated polymer is a fluorinated hydrocarbon polymer selected from the group consisting of polytetrafluoroethylene, polyfluoropropylene and copolymers of tetrafluoroethylene with fluoropropylene.

27. The method of claim 8 wherein said biaxially heat shrinkable fluorinated polymer comprising the sleeve is prepared by biaxially stretching said fluorinated polymer beyond its room temperature elastic limits.

28. The method of claim 8 wherein the roller has a steel surface.

* * * * *